(12) United States Patent
Pretty et al.

(10) Patent No.: US 9,932,119 B2
(45) Date of Patent: Apr. 3, 2018

(54) BREAK-AWAY THERMAL BLANKET JOINT

(71) Applicant: ROHR, INC., Chula Vista, CA (US)

(72) Inventors: Michael Sean Pretty, Jamul, CA (US); Stephen M. Erickson, Chula Vista, CA (US)

(73) Assignee: ROHR, INC., Chula Vista, CA (US)

( * ) Notice: Subject to any disclaimer, the term of this patent is extended or adjusted under 35 U.S.C. 154(b) by 735 days.

(21) Appl. No.: 14/222,428

(22) Filed: Mar. 21, 2014

(65) Prior Publication Data
US 2015/0266587 A1    Sep. 24, 2015

(51) Int. Cl.
*B64D 29/06* (2006.01)
*F02C 7/24* (2006.01)

(52) U.S. Cl.
CPC .............. *B64D 29/06* (2013.01); *F02C 7/24* (2013.01); *F05D 2260/311* (2013.01); *Y10T 403/471* (2015.01)

(58) Field of Classification Search
CPC ..... B64D 29/06; F02C 7/24; F05D 2260/311; Y10T 403/471; F02K 1/766
USPC .......... 415/178; 166/364; 180/69.2; 244/110 B; 60/226.2
See application file for complete search history.

(56) References Cited

U.S. PATENT DOCUMENTS

| | | | | |
|---|---|---|---|---|
| 4,634,051 A * | 1/1987 | Dudley | ............... | A01M 7/0078 239/168 |
| 5,957,425 A * | 9/1999 | Conway | .................... | G09F 7/20 248/548 |
| 6,244,539 B1 * | 6/2001 | Liston | .................... | B64D 29/00 181/212 |
| 6,561,714 B1 * | 5/2003 | Williams | ............... | F16L 23/036 166/364 |
| 7,275,362 B2 * | 10/2007 | Strunk | .................... | F02K 1/766 244/110 B |
| 7,604,077 B2 * | 10/2009 | Renard | .................. | B62D 25/16 180/69.2 |
| 2007/0120008 A1 * | 5/2007 | Conner | .................. | B64D 27/20 244/53 B |
| 2011/0036068 A1 * | 2/2011 | Lefebvre | .................. | F01D 9/04 60/262 |

* cited by examiner

Primary Examiner — Mark Laurenzi
Assistant Examiner — Paul Thiede
(74) Attorney, Agent, or Firm — Snell & Wilmer, L.L.P.

(57) ABSTRACT

A thermal blanket system is provided on an aircraft component to protect the component, for example, from engine heat. The component has a latch half attached thereto, which is also covered by the thermal blanket system. In some scenarios, the latch half may need to be detached from the component because the latch was stuck closed. The thermal blanket system includes a portion thereof which overlaps the latch half and breaks away from the remainder of the thermal blanket system when the latch half is detached.

18 Claims, 7 Drawing Sheets

BREAK-AWAY THERMAL BLANKET JOINT

FIELD

The present disclosure relates to nacelles for an aircraft propulsion system, and more specifically, to thermal blankets that protect nacelles from engine heat.

BACKGROUND

During aircraft maintenance operation, interior portions of the propulsion system may need to be accessed. Access may be gained by actuating one or more portions of the nacelle from a closed position to an open position. One or more portions of a nacelle may be held together by latches. If a latch fails to release, the latch may need to be removed so that the nacelle can be opened. Latch removal may lead to damage to portions of a thermal protection system ("TPS"), which typically comprises insulating thermal blankets fastened to nacelle components to protect them from radiating and convective heat from the engine. This may cause an aircraft to be grounded until the TPS can be replaced, which is detrimental to the availability or utilization rate of the aircraft.

SUMMARY

In various embodiments, a system may comprise a structure, a latch system, a first portion of a TPS, a second portion of the TPS. The latch system may comprise a first latch half and a second latch half. The first latch half may be attached to the structure. The first portion of the TPS may be coupled to the structure. The second portion of the TPS may be coupled to the first latch half. The first portion of the TPS and the second portion of the TPS have a breakaway joint formed there between. The breakaway joint may be configured to separate in response to the first latch half being detached from the structure.

In various embodiments, a propulsion system may comprise a gas turbine engine, a first panel, a second panel, a first latch half, a second latch half, and a thermal protection system. The first panel and the second panel may be adapted to be moveable between an open position in which maintenance access is granted to the engine and a closed position in which the first and second panel substantially surround and enclose at least a portion of the engine. The first latch half may be connected to the first panel. The second latch half may be connected to the second panel. The first and the second latch halves may be adapted to latch together when the first and second panels are in the closed position to hold the panels in the closed position. The thermal protection system may cover a substantial portion of a face of the first panel facing the engine when the first and second panels are closed. The thermal protection system may include a breakaway portion surrounding and substantially covering the first latch half.

In various embodiments, a thermal protection system may comprise a first blanket portion and a second blanket portion. The second blanket portion may be coupled to the first blanket portion via a breakaway joint. The breakaway joint may be configured to provide a substantially permanent attachment of the second blanket portion to the first blanket portion during operation. The breakaway joint may also be configured to allow the second blanket portion to cleanly separate from the first blanket portion in response to a maintenance event.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Furthermore, any reference to singular includes plural embodiments, and any reference to more than one component or step may include a singular embodiment or step.

Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

Figure 1A:
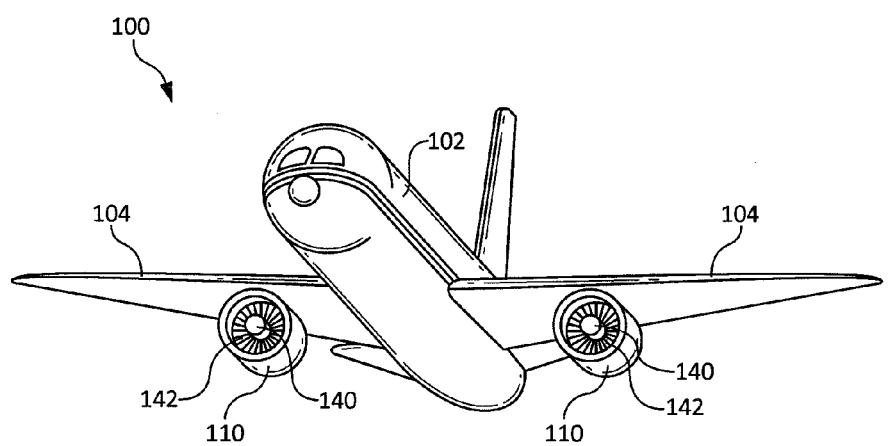
FIG. 1A illustrates a perspective view of an aircraft, in accordance with various embodiments.
Figure 1B:
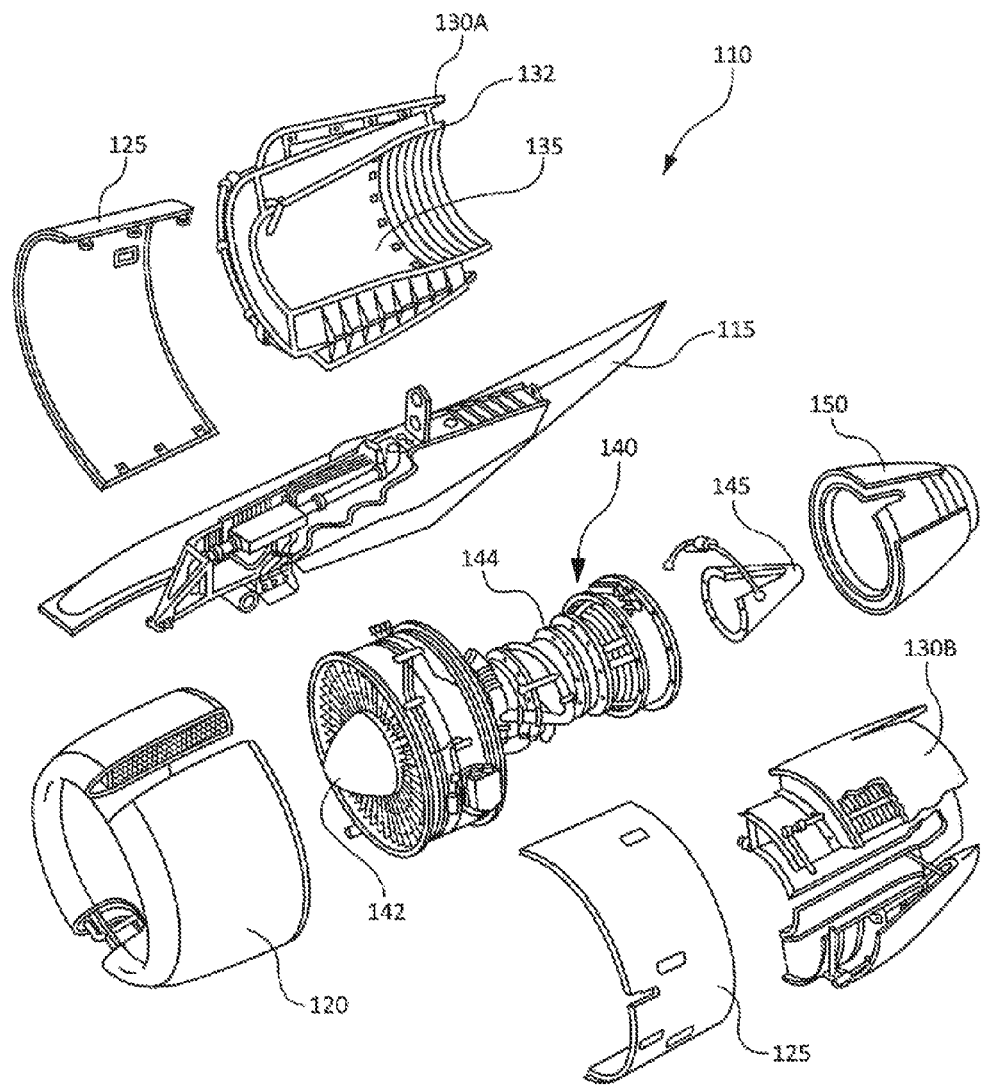
FIG. 1B illustrates an exploded perspective view of propulsion system, in accordance with various embodiments.

In various embodiments and with reference to FIGS. 1A and 1B, an aircraft 100 may comprise a fuselage 102 and a pair of wings 104. Propulsion system 110 (e.g., turbofan jet engine with a nacelle assembly) may be mounted on the underside of wing 104. Propulsion system 110 may be configured to provide forward thrust and/or propulsion for aircraft 100.

In various embodiments, propulsion system 110 may comprise an engine 140 (e.g., a fan 142 and an engine core 144), a pylon 115, and a nacelle package. The typical nacelle package, or more simply a nacelle, may comprise an inlet 120, a fan cowl 125, a thrust reverser 130A and 130B, and an exhaust system including an exhaust cone 145, and exhaust nozzle 150. The nacelle surrounds the engine core 144 providing smooth aerodynamic surfaces for airflow around and into engine 140. The nacelle also helps define a bypass air duct through propulsion system 110.

In various embodiments, fan 142 may draw and direct a flow of air into and through propulsion system 110. After fan 142, the air is divided into two principal flow paths, one flow path through engine core 144, and another flow path through a bypass air duct. The engine core flow path is directed into engine core 144 and initially passes through a compressor that increases the air flow pressure, and then through a combustor where the air is mixed with fuel and ignited. The combustion of the fuel and air mixture causes a series of turbine blades at the rear of engine core 144 to rotate, and to drive the engine's rotor and fan. The high-pressure exhaust gases from the combustion of the fuel and air mixture are thereafter directed through exhaust nozzle 150 at the rear of engine 140 for thrust.

Figure 2:
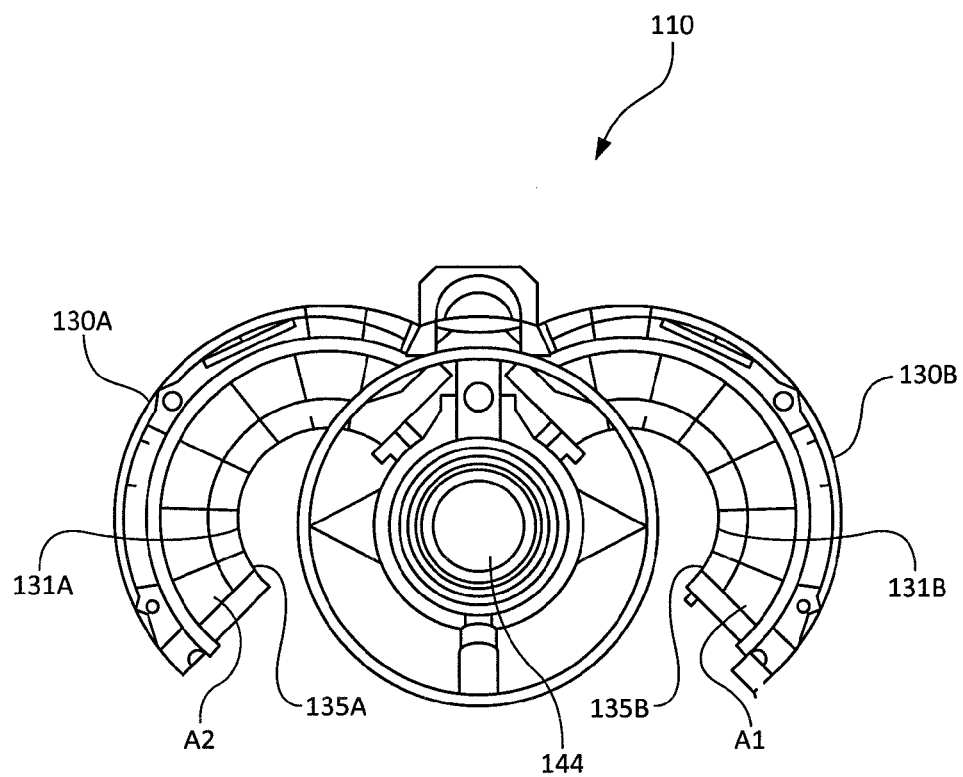
FIG. 2 illustrates a cross-sectional front view of a view of propulsion system, in accordance with various embodiments.

In various embodiments and with reference to FIGS. 1B and 2, the bypass air flow path includes air that is directed around engine core 144 in a duct or ducts defined by the nacelle (e.g., the area aft fan 142 and between thrust reverser 130 and inner fixed structure ("IFS") 131). IFS 131 may include an IFS panel 131A and IFS panel 131B. The bypass air exits the bypass air ducts A1 and A2 at an exhaust nozzle at the aft end of the nacelle for thrust. In turbofan engines, the bypass flow typically provides a large percentage of the thrust for an aircraft. The bypass air ducts A1 and A2 in the nacelle in FIG. 2 are C-shaped, and are principally defined by the exterior surface of IFS 131 and the inside surface of the thrust reverser 130A and 130B (shown as thrust reverser 130A and thrust reverser 130B in FIG. 1B).

In various embodiments, engine 140 may be mounted to pylon 115 in two places. One of these at the aft end of the pylon 115, over the engine turbine case, and in one of two places at the forward end of pylon 115: the engine core (core mount) or the engine fan case (fan mount). Pylon 115 transmits structural loads (including thrust) between engine 140 and wing 104, as shown in FIG. 1A.

In various embodiments, thrust reverser 130 may comprise two halves, thrust reverser 130A and thrust reverser 130B, generally configured to surround engine core 144. Thrust reverser 130 may be hinged to the pylon 115 via one or more hinges which may provide access to an interior portion of propulsion system 110 and/or engine 140. For example, and as shown in FIG. 2, thrust reverser 130A and thrust reverser 130B may be opened and/or rotated about an attachment point on pylon 115. The thrust reverser 130 may comprise IFS panel 131A and IFS panel 131B and an outer sleeve. IFS panel 131A and IFS panel 131B may generally surround the engine core 144.

In various embodiments, first hemisphere of thrust reverser 130A and second hemisphere of thrust reverser 130B may be actuated to a closed position and retained together by a latch system. In this regards, the latch system may be configured to hold and/or retain first hemisphere of thrust reverser 130A and second hemisphere of thrust reverser 130B in a closed position around engine core 144.

In various embodiments and with continued reference to FIGS. 1B and 2, thermal protection system ("TPS") 135 (e.g., one or more thermal blankets) may be installed on an interior surface of the IFS 131 facing the engine core 144. TPS 135 may be configured to insulate and/or contain heat from engine core 144. TPS 135 may be configured to act as an insulating barrier to protect IFS 131 against the heat emitted by engine core 144 and other components. Without the thermal protection of TPS 135, the IFS 131 might overheat and lose structural integrity. TPS 135 may generally be attached to a bond panel of each of IFS panel 131A and IFS panel 131B. In this regard, fasteners may couple TPS 135 and/or at least portions of the TPS 135 to the bond panel. The bond panel may be the interior surface of each of IFS panel 131A and IFS panel 131B.

Figure 3A:
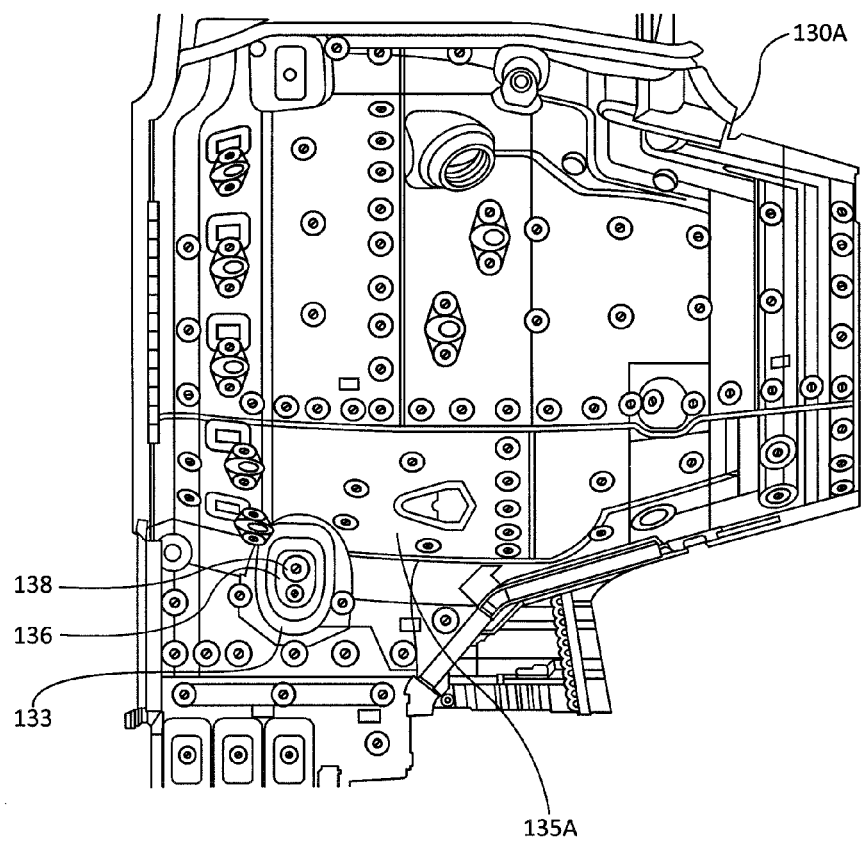
FIG. 3A illustrates an inner fixed structure including a thermal protection system, in accordance with various embodiments.
Figure 3B:
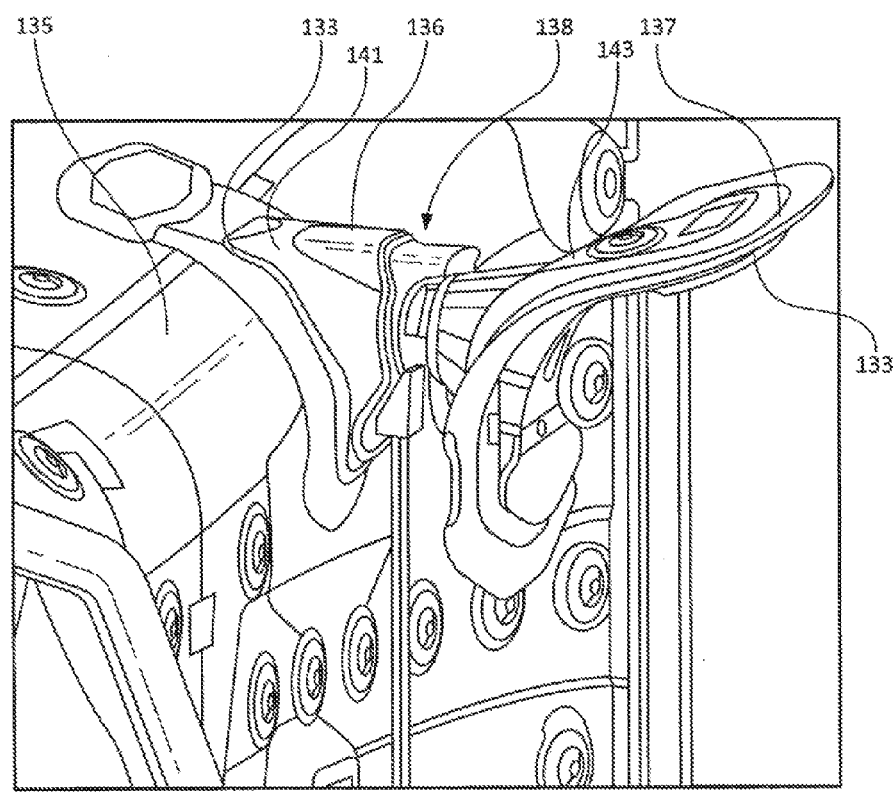
FIG. 3B illustrates a first portion of the joint and a second portion of the joint that connect the two nacelle hemispheres, in accordance with various embodiments.
Figure 4A:
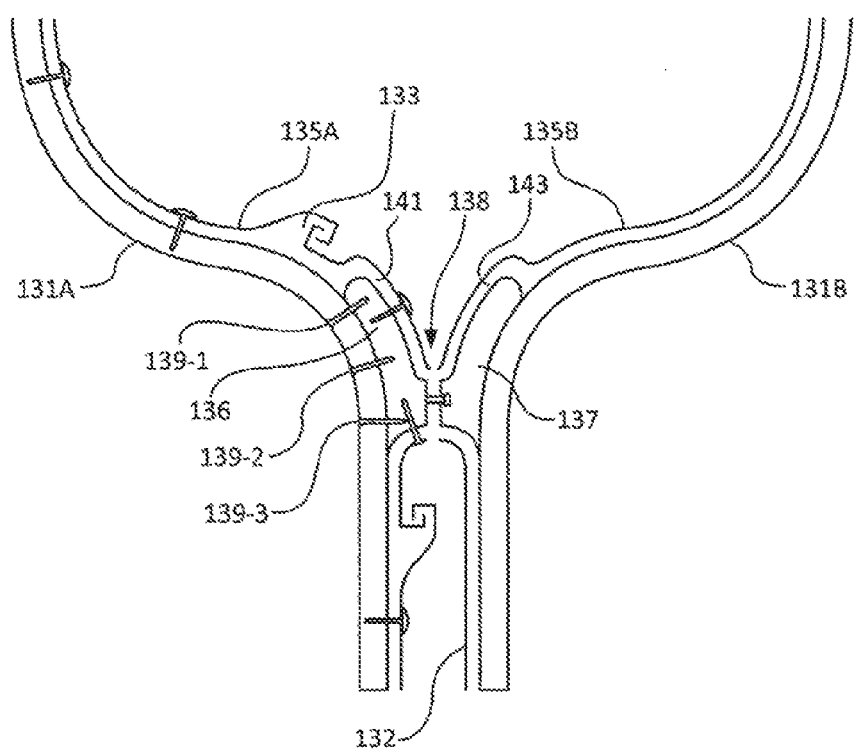
FIG. 4A schematically illustrates a first portion of an inner fixed structure and a second portion of an inner fixed structure joined together by a latch assembly, in accordance with various embodiments.
Figure 4B:
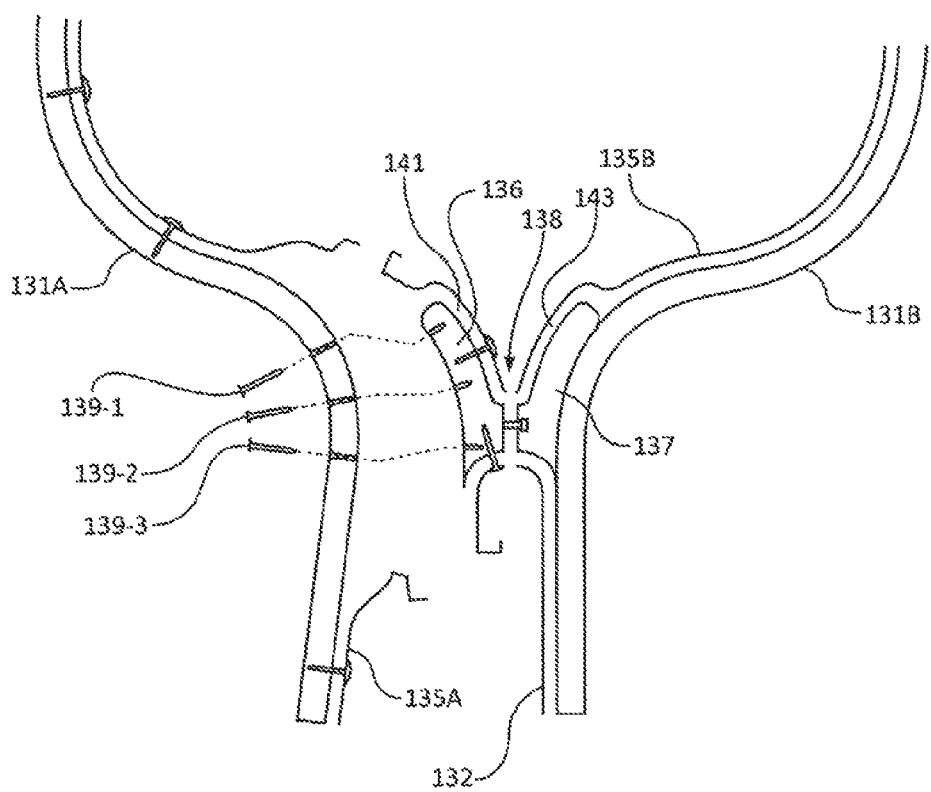
FIG. 4B schematically illustrates a first portion of an inner fixed structure separated from a second portion of an inner fixed structure, in accordance with various embodiments.

In various embodiments and with reference to FIGS. 3A-3B, IFS panel 131A and IFS panel 131B may be held and/or joined together by a latch system 138. Latch system 138 may be any suitable latch system. For example, latch system 138 may be a bumper latch system. Latch system 138 may comprise a first joint portion 136 (e.g., a first latch half) and a second joint portion 137 (e.g., a second latch half). The bumper latch system may be capable of being remotely actuated. For example, the bump latch system may comprise a cable 132 that may be actuated to open latch system 138, thus permitting IFS panel 131A and IFS panel 131B to separate and open. Moreover, latch system 138 may constrain and/or limit IFS panel 131A and IFS panel 131B from flexing outward.

In various embodiments and with reference to FIGS. 3A-3B and 4A-4B, during maintenance operations latch system 138 may be released to gain access to portions of propulsion system 110 such as, for example, engine core 144. During operation, IFS panel 131A and IFS panel 131B may be operatively coupled to one another and closed when the first joint portion 136 is latched to second joint portion 137. To unlatch latch system 138, first joint portion 136 may be released from second joint portion 137.

In some circumstances, the latch system 138 may be stuck and it may not be possible to release first joint portion 136 from second joint portion 137. Because first joint portion 136 is attached to IFS panel 131A, and second joint portion 137 is attached to IFS panel 131B, when the latch is stuck the panels 131A and 131B cannot be separated and opened for maintenance access. In such a scenario, it becomes necessary to disconnect first portion 136 from IFS panel 131A. To do this, fasteners 139-1, 139-2 and 139-3 and any other fasteners attaching the first portion 136 to the IFS panel 131A may be removed. Fasteners 139 may be accessed from the fan duct. IFS panel 131A, when fully separated from first joint portion 136, can now be swung away from IFS panel 131B and opened.

In a typical nacelle installation, an integral portion of the TPS135A that overlaps the first joint portion 136 may be trapped between first joint portion 136 and second joint portion 137, while the remainder of TPS 135A swings open with IFS half 131A, which may result in the TPS 135A tearing apart and becoming irreparably damaged. The irreparable damage required replacement of an entire portion of the TPS (e.g., TPS 135A), which may be time consuming and expensive.

In various embodiments, TPS 135 may comprise discrete pieces, portions and/or modules including for example, first portion 141 and second portion 143. First portion 141 of TPS 135A may surround first joint portion 136 and may be a discrete piece of TPS 135. In this regard, the first portion 141 of TPS 135A may be coupled to the remainder of TPS 135A with a "breakaway" joint 133. Breakaway joint 133 may be configured to allow a discrete portion of TPS 135 (e.g., first portion 141 of TPS 135A and/or second portion 143 of TPS 135B) to be separated from the remainder of TPS 135 without any irreparable and/or substantial damage, deformation and/or degradation.

In various embodiments, breakaway joint 133 may be any suitable joint that is capable off allowing a clean separation (e.g., a non-destructive separation) between discrete portions of TPS 135. In this regard, breakaway joint 133 does not cause irreparable damage deformation and/or degradation to the joined structures in response to breakaway joint 133 being separated. For example, breakaway joint 133 may be a frangible joint, a spot weld, an overlapping fold between discrete TPS 135 portions, or overlapping and interfering discrete TPS 135 portions (e.g., where first portion 141 and TPS 135A have an interference fit with one another).

In various embodiments, latch system 138 may be unfastened from IFS 131 (e.g., by removing fasteners 139) allowing at least one of first portion 141 and second portion 143 to separate from TPS 135 at a breakaway joint 133. As noted herein, breakaway joint 133 may be an overlapping joint, a folded over join, and/or a frangible joint. In this regard, first portion 141 and/or second portion 143 may be removed, separated and/or detached from TPS 135 at breakaway joint 133 without damaging, cutting, and/or otherwise removing other discrete portions of TPS 135A and/or TPS 135B to gain access to first joint portions 136 and/or second joint portion 137.

In various embodiments, breakaway joint 133 may include a material and/or bond with adhesive properties such as, for example, room temperature vulcanizing (RTV) silicone, a spot weld, and/or the like. In this regard, breakaway joint 133 may be coupled and/or may bond discrete portions of TPS 135 in a substantially permanent manner for aircraft operation. However, during a maintenance event and in the event of a latch system 138 failure, first joint portion 136 or second joint portion 137 may be detached from the IFS panels 131A or 131B, respectively, and first portion 141 of TPS 135A and/or second portion 143 of TPS 135B may be cleanly and non-destructively separated from the remainder of the TPS 135A or 135B. The semi-permanent nature of breakaway joint 133 may allow a stuck latch system 138 to be opened without any significant damage to TPS 135. In this regard, the first portion 141 of TPS 135A and/or the second portion 143 of TPS 135B may detach from the remaining TPS 135 structure, reducing, limiting, and/or eliminating any damage, deformation and/or degradation to TPS 135.

In various embodiments, latch system 138, first joint portion 136 and/or second joint portion 137 may be repaired in response first portion 141 and/or second portion 143 being separated from TPS 135. In this regard, with IFS 131 open, a technician may access latch system 138 to perform a repair. In response to a repair being complete, break joint 133 may be re-established between at TPS 135 and at least one of first portion 141 and second portion 143. In this regard, TPS 135, first portion 141 and/or second portion 143 may be undamaged and may be re-used.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:
1. A system, comprising:
an inner fixed structure (IFS) including a first IFS panel and a second IFS panel;
a thermal protection system layer (TPS layer) having an overlying, attached relationship to the IFS and includ- ing a first TPS layer portion, the TPS layer configured to provide thermal insulation protection for the IFS;

a latch system disposed intermediate the first IFS panel and the second IFS panel and including a first latch half and a second latch half, the first latch half being attached to the first IFS panel and the second latch half attached to the second IFS panel so that the first IFS panel has structural communication with the second IFS panel via the first latch half being latched to the second latch half, the first TPS layer portion being attached to the first latch half;

a break-away joint disposed in the system in a manner that connects the TPS layer to the first TPS layer portion, the disposed break-away joint being configured to break when the attached first latch half is detached from the first IFS panel in the assembled system;

wherein when the attached first half latch is detached from the first IFS panel in the assembled system the disposed break-away joint breaks so that the first TPS layer portion is detached from the TPS layer and the first IFS panel separates so that the structural communication of the first IFS panel with the second IFS panel does not occur.

2. The system of claim 1, wherein the break-away joint is created with a material having adhesive properties.

3. The system of claim 2, wherein the material is room temperature vulcanizing silicone.

4. The system of claim 1, wherein the break-away joint is created with a spot weld.

5. The system of claim 1, wherein the first latch half is coupled to the first IFS panel with a plurality of fasteners.

6. The system of claim 5, wherein the first latch half is removably coupled to the first IFS panel with the plurality of fasteners.

7. The system of claim 6, wherein the first TPS layer portion is re-attachable to the TPS layer by at least one of a material having adhesive properties or a spot weld.

8. The system of claim 1, further comprising a second TPS layer portion attached to the second latch half.

9. The system of claim 1, further comprising a gas turbine engine, the IFS surrounding the gas turbine engine and the system comprising a propulsion system.

10. A propulsion system, comprising:
a gas turbine engine;
a first panel and a second panel adapted to be moveable between an open position in which maintenance access is granted to the gas turbine engine and a closed position in which the first panel and the second panel substantially surround and enclose at least a portion of the gas turbine engine;
a first latch half connected to the first panel;
a second latch half connected to the second panel, the first latch half and the second latch half adapted to latch together when the first panel and the second panel are in the closed position to hold the first panel and the second panel in the closed position;
a thermal protection system layer (TPS layer) having an overlying, attached relationship to the first panel and including a first TPS layer portion, the TPS layer configured to provide thermal insulation protection for the first panel, and the first TPS layer portion being attached to the first latch half; and
a break-away joint disposed intermediate the first TPS layer portion and the TPS layer, wherein the first TPS layer portion is coupled to the TPS layer via the break-away joint, the disposed break-away joint being configured to allow the first TPS layer portion to separate from the TPS layer when the attached first latch half is detached from the first IFS panel in the assembled system;

wherein when the attached first half latch is detached from the first IFS panel in the assembled system the disposed break-away joint breaks so that the first TPS layer portion is detached from the TPS layer.

11. The propulsion system of claim 10, wherein the first panel and the second panel are portions of an inner fixed structure.

12. The propulsion system of claim 10, wherein the break-away joint constitutes a frangible joint.

13. The propulsion system of claim 10, wherein the break-away joint is made from at least one of:
an overlapping fold between the first TPS layer portion and the TPS layer;
an interference between the first TPS layer portion and the TPS layer;
a spot weld; and
a room temperature vulcanizing silicone.

14. A thermal protection system, comprising:
a first blanket portion attached to an inner fixed structure (IFS) of a thrust reverser;
a second blanket portion; and
a break-away joint disposed in the thermal protection system in a manner that connects the first blanket portion to the second blanket portion, the break-away joint providing substantially permanent attachment of the second blanket portion to the first blanket portion, and the break-away joint allows the second blanket portion to non-destructively separate from the first blanket portion in response to the first blanket portion and the second blanket portion being pulled away from each other,
wherein the break-away joint is a frangible joint made from at least one of a spot weld or a room temperature vulcanizing silicone.

15. The thermal protection system of claim 14, wherein the frangible joint is defined by overlapping folds between the first blanket portion and the second blanket portion.

16. The thermal protection system of claim 14, wherein the break-away joint between the first blanket portion and the second blanket portion is an overlapping fold between the first blanket portion and the second blanket portion.

17. The thermal protection system of claim 14, wherein the break-away joint between the first blanket portion and the second blanket portion is an interference between the first blanket portion and the second blanket portion.

18. The thermal protection system of claim 14, wherein the thermal protection system is for thermally insulating the IFS from an engine.

* * * * *